United States Patent [19]

Goronszy

[11] Patent Number: 5,013,441
[45] Date of Patent: May 7, 1991

[54] BIOLOGICAL NUTRIENT REMOVAL WITH SLUDGE BULKING CONTROL IN A BATCH ACTIVATED SLUDGE SYSTEM

[76] Inventor: Mervyn C. Goronszy, 8/106 Young Street, Cremorne, New South Wales-2090, Australia

[21] Appl. No.: 221,753

[22] Filed: Jul. 20, 1988

[51] Int. Cl.⁵ .............................................. C02F 3/30
[52] U.S. Cl. .................................... 210/605; 210/621; 210/623
[58] Field of Search ............... 210/605, 621, 623, 630, 210/903, 906, 603

[56] References Cited

U.S. PATENT DOCUMENTS

| | | | |
|---|---|---|---|
| 3,681,236 | 8/1972 | Bergles et al. | 210/605 |
| 4,056,465 | 11/1977 | Spector | 210/903 |
| 4,271,026 | 6/1981 | Chen et al. | 210/605 |
| 4,479,876 | 10/1984 | Fuchs | 210/605 |
| 4,655,925 | 4/1987 | Tabata et al. | 210/605 |
| 4,663,044 | 5/1987 | Goronszy | 210/610 |
| 4,867,883 | 9/1989 | Daigger et al. | 210/630 |

FOREIGN PATENT DOCUMENTS 58-36639 4/1980 Japan .
60-129194 12/1983 Japan .
8808410 11/1988 PCT Int'l Appl. .

*Primary Examiner*—Stanley Silverman
*Assistant Examiner*—Christopher Upton
*Attorney, Agent, or Firm*—Grant L. Hubbard

[57] ABSTRACT

An activated sludge sewage treatment process wherein sewage is received into a sewage treating basin in first zone into which activated sludge is mixed and retained for a period sufficient to form a non-bulking sludge and absorb biodegradable dissolved compounds into the activated sludge, and aerated and subjected to a quiescent condition to permit settling of the sludge in a zone characterized in that it has less than approximately twenty percent of the biochemical oxygen demand of the original sewage and where in the sludge is non-bulking, decanting treated sewage from the upper portion of the basin after allowing the sludge to settle, and cyclically repeating the process, anaerobically fermenting the influent sewage, and recycling anaerobically fermented partially treated sewage to the input of the influent sewage is disclosed.

2 Claims, 5 Drawing Sheets

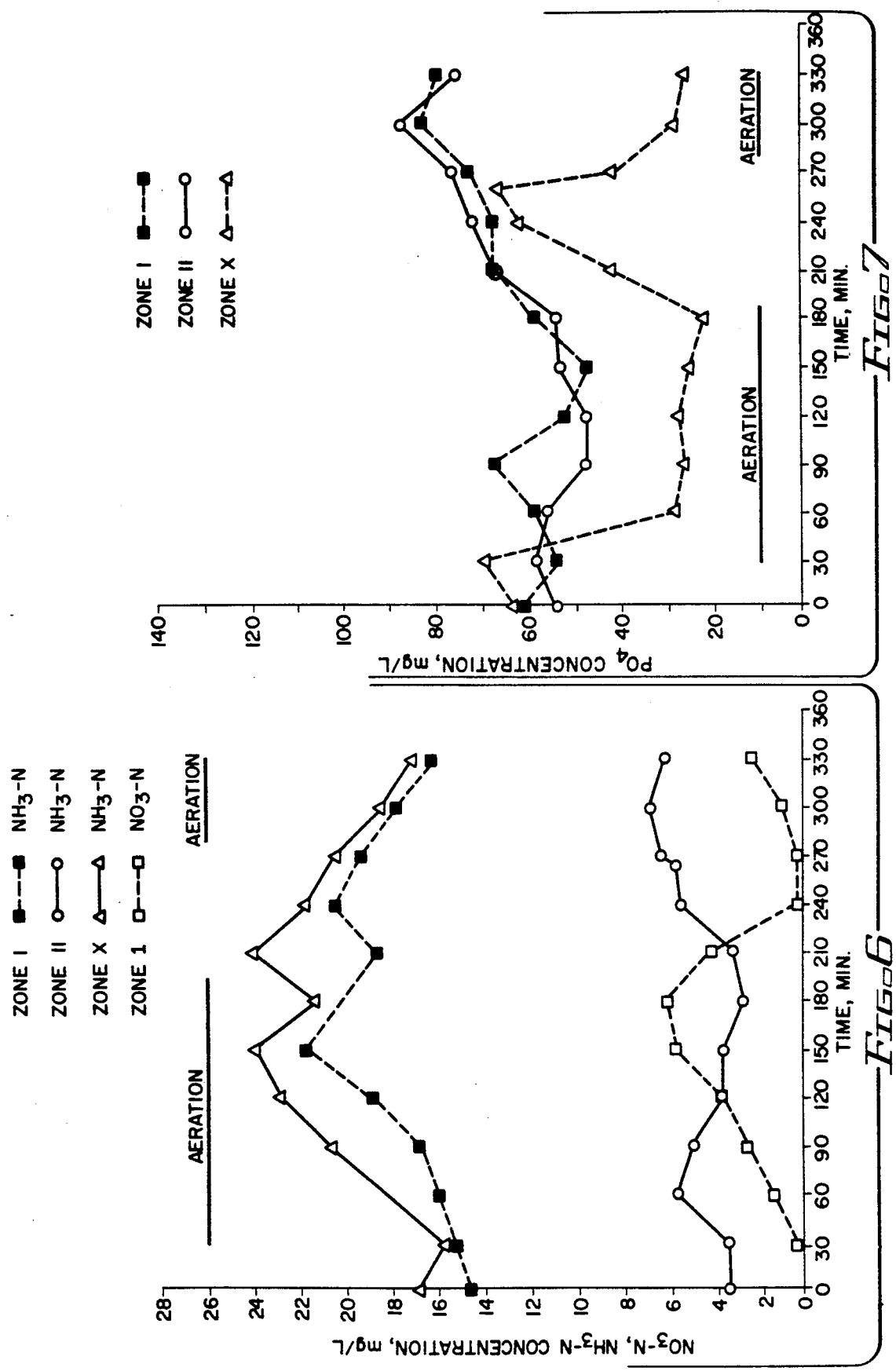

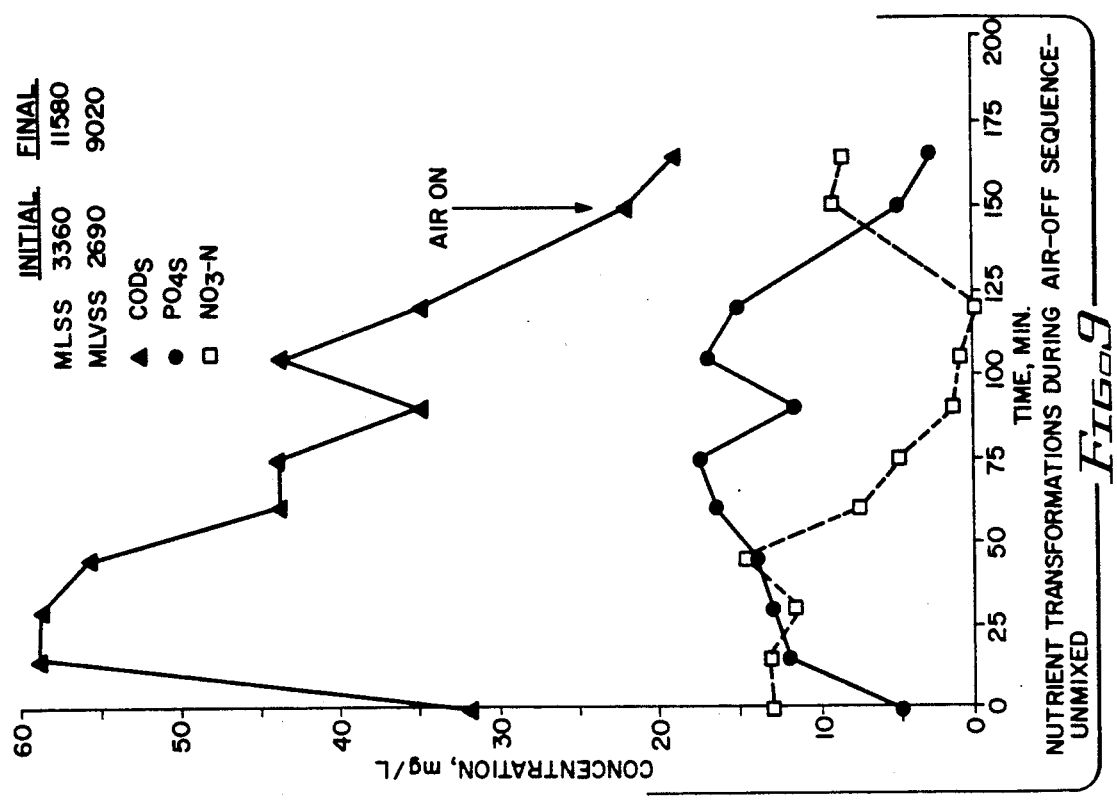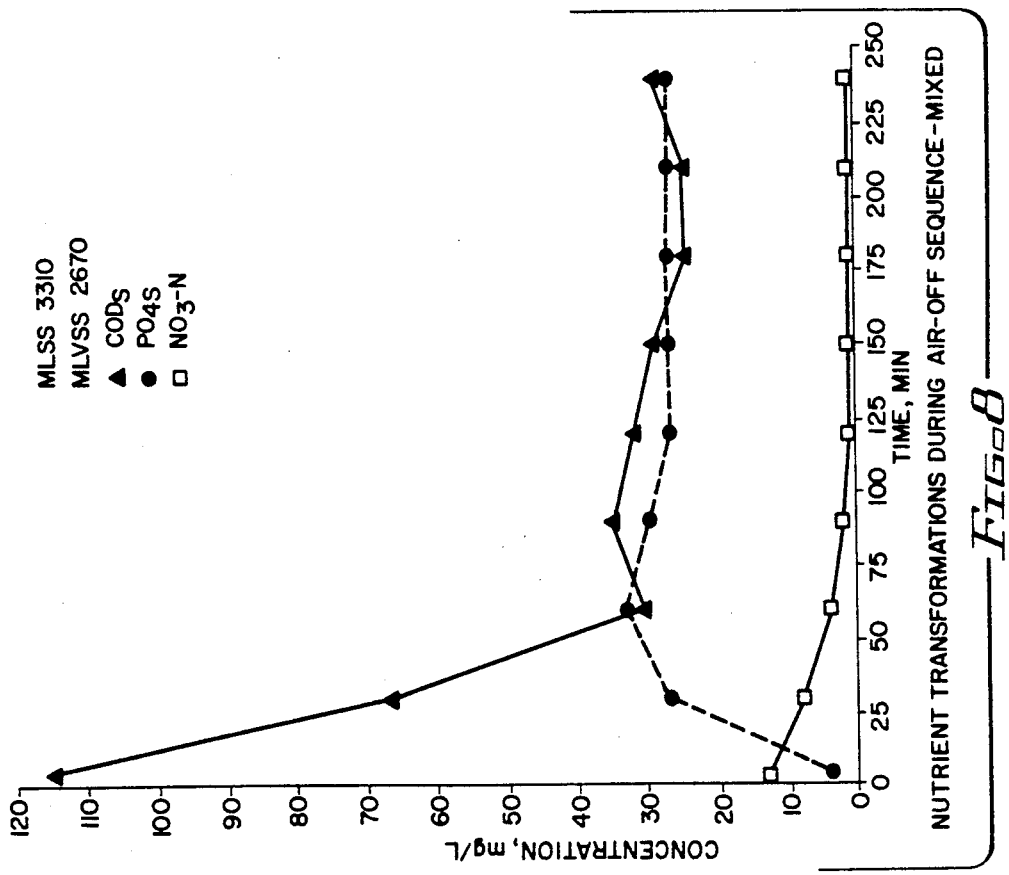

BIOLOGICAL NUTRIENT REMOVAL WITH SLUDGE BULKING CONTROL IN A BATCH ACTIVATED SLUDGE SYSTEM

FIELD OF THE INVENTION

This invention relates to the treatment of sewage generally and specifically to the removal of phosphates and nitrogen from sewage.

BACKGROUND OF THE INVENTION

The following abbreviations as used throughout the following specification and in the claims have the meanings stated therefor.

BOD     Biochemical Oxygen Demand.*
COD     Chemical Oxygen Demand.*
$COD_C$     Colloidal chemical oxygen demand.*
$COD_T$     Total chemical oxygen demand.*
$COD_S$     Soluble chemical oxygen demand.*
DO     Dissolved Oxygen content.*
MLSS     Mixed Liquor Suspended Solids.*
$NH_3$-N     Ammonia Nitrogen.*
$NO_3$-N     Nitrate Nitrogen.*
OUR     Oxygen Uptake Rate, mg/gm VSS.
$PO_{4S}$     Soluble Phosphate.*
$PO_{4T}$     Total Phosphate.*
HRT     Hydraulic Retention Time, the residence time of a given batch or lot of sewage in a particular zone or system, expressed in minutes and hours.
SS     Settled Sludge.*
SSV     Sludge Settled Volume.
TKN     Total nitrogen as determined by the Kjeldahl method.*
VSS     Volatile Suspended Solids.*

\* Concentrations expressed in milligrams per liter, mg/L, unless otherwise stated.

In treating wastewaters containing ammonia, it is known that certain aerobic autotrophic microorganisms can oxidize ammonia to nitrite and that nitrite can be further microbially oxidized to nitrate. This reaction sequence, viz., oxidation of ammonia to nitrate, is known in the art as nitrification and the responsible microorganisms are: Nitrosomonas and Nitrobacter. More specifically, Nitrosomonas are known to oxidize ammonia to nitrite in aqueous systems in which (1) dissolved oxygen levels are in excess of approximately 0.5 mg/l (as disclosed in H. E. Wild et al., "Factors Affecting Nitrification Kinetics," *J. Wat. Pollut. Cont. Fed.*, 43, 1845–1854 (1971)) and (2) free ammonia in solution is held below about 10 to 150 mg/l (as disclosed in Anthonisen et al., "Inhibition of Nitrification by Ammonia and Nitrous Acid," *J. Wat. Pollut. Cont. Fed.*, 43, 835–852 (1976)). Nitrosomonas microorganisms are ubiquitous in the environment, and seed for the development of a Nitrosomonas population in a sludge is therefore available from a wide variety of sources. Both Nitrosomonas growth rates and their ammonia-nitrogen oxidation reaction rates are a function of solution temperature, pH and dissolved oxygen levels. For example, a reaction rate of about 2.4 mg nitrogen oxidation per mg of microorganism per day at a temperature of 20° C., a pH of 7.0 and a dissolved oxygen level of between 1 and 2 ppm has been reported. (See G. M. Wong-Chong, "Kinetics of Microbial Nitrification as Applied to the Treatment of Animal Wastes," Ph.D. Thesis, Cornell University, 1974.)

Further, Nitrobacter are known to oxidize nitrite to nitrate in aqueous systems where the dissolved oxygen level is in excess of approximately 0.5 mg/l (see H. E. Wild et al., supra) and free ammonia in solution is held below about 0.1 to 10 mg/l and free nitrous acid in solution is held below about 0.2 to 2.8 mg/l (see Anthonisen et al., supra). Nitrobacter microorganisms are ubiquitous in the environment also and seed for development of a Nitrobacter population in a sludge is therefore available from a wide variety of sources. Both Nitrobacter growth rates and their nitrite reaction rates are a function of solution temperature, pH and dissolved oxygen levels. For example, a reaction rate of about 7.0 mg nitrogen oxidation per mg of microorganism per day at a temperature of 20° C., a pH of 7.0, and a dissolved oxygen level of between 1 and 2 ppm has been reported (see Wong-Chong, supra).

Complete elimination of ammonia entails the oxidation to nitrite and/or nitrate followed by reduction of the nitrite and/or nitrate to nitrogen gas. This latter reduction of the nitrite and/or nitrate to nitrogen gas is generally known in the art as denitrification and the reaction of reduction of nitrite and/or nitrate to free nitrogen is mediated by facultative heterotrophic microorganisms generally of the genera of Pseudomonas, Achromobacter, Bacillus and Micrococcus. These microorganisms are capable of oxidizing organic matter by utilizing oxygen and, in the absence of oxygen, they can use nitrite and/or nitrate, if present. Facultative heterotrophic microorganisms are further ubiquitous in the environment, and seed for development of populations in a sludge is therefore available from a variety of sources. Facultative heterotrophic microorganism growth rates and denitrification reaction rates and a function of solution temperature, pH and ratio of dissolved oxygen to nitrite/nitrate oxygen availability. For example, a denitrification reaction rate of about 0.6 mg nitrogen oxidation per mg of microorganism per day with methanol as an organic at a temperature of 20° C. and a pH of 8 to 9 in the absence of dissolved oxygen has been reported (see R. P. Michael, "Optimization of Biological Denitrification Reactors in Treating High Strength Nitrate Wastewater," M. S. Thesis, University of Vermont, May 1973).

Frequent references are also made in the literature to unexplained nitrogen losses from basically aerobic sludges (e.g., as disclosed in K. Wuhrmann, "Effect of Oxygen Tension on Biochemical Reactions in Sewage Purification Plants" in "Advances in Biological Waste Treatment," W. W. Eckenfelds, Jr. and B. J. McCabe, Eds., Pergamon Press (1963); Barth et al., "Nitrogen Removal by Municipal Wastewater Treatment Plants," *J. Wat. Pollut. Cont. Fed.*, 38, 7 (1966); and D. C. Climenhage, "Nitrogen Removal for Municipal Wastewater," Project No. 72-5-15, Ontario Ministry of the Environment (1975)). It has been speculated that these losses are due either to spurious amounts of "anaerobic" denitrification which occur in random localized "dead spots" in the sludge where dissolved oxygen levels have fallen to zero or to "aerobic" denitrification. In fact, in 1977, the inventor of the invention described and claimed herein speculated that "aerobic" denitrification does occur and is favored by high microbial sludge concentrations, low dissolved oxygen levels of about 1 ppm and a solution pH of 7.0 (see G. M. Wong-Chong et al., "Advanced Biological Oxidation of Coke Plant Wastewaters for the Removal of Nitrogen Compounds," *Carnegie-Mellon Inst. of Research Report to the American Iron and Steel Institute*, (Apr. 1977)). As a theoretical explanation, Wong-Chong, supra, postulated a porous microorganism particle model with oxygen gradients such that some portion of the core of the basically aerobic particle is anoxic. Others have speculated similarly regarding the existence of "aerobic" denitrification. (See, for example, L. B. Wood et al., "Some Observations on the Biochemistry and Inhibition of Nitrification," *Water Research*, 5, 543–551 (1981); I. Murray et al., "Interrelationships between Nitrogen Balance, pH and Dissolved Oxygen in an Oxidation Ditch Treating Farm Animal Waste, *Water Research*, 9, 25–30 (1975); and J. P. Voets, et al., "Removal of Nitrogen from Highly Nitrogenous Wastewaters," *J. Wat. Pollut. Cont. Fed.*, 47, 394–398 (1975)).

The above biologically mediated processes of nitrification and denitrification, and conversion of ammonia to free nitrogen using Nitrosomonas, Nitrobacter and facultative microorganisms are well known. However, there is a large economic incentive for improvements in conventional approaches to treating wastewater containing high levels of ammonia and other contaminants. Research and development to upgrade the performance of biological treatment systems to handle high ammonia strength liquors has been extremely limited and has been basically considered unsuccessful.

With the exception of the speculations discussed above on how "aerobic" denitrification could possibly occur, all of the other prior art basically discredits the serious possibility of controllably achieving simultaneous nitrification and denitrification from a single sludge. In fact, the prior art has basically set forth that nitrification/denitrification conditions are thermodynamically antagonistic and as such, nitrification should be separated from denitrification (see Bishop et al., "Single-stage Nitrification-Denitrification," *J. Wat. Pollut. Cont. Fed.*, 48, 521–531 (1976)).

Numerous possible permutations and combinations, which can be logically considered of multi-reaction step nitrification/denitrification systems, have been postulated in the literature. These, however, have been largely for application to the processing of low ammonia strength municipal sewage waste (see Bishop et al., supra; Climenhage, supra, Barth et al., "Chemical-Biological Control of Nitrogen and Phosphorus in Wastewater Effluent," *J. Wat. Pollut. Cont. Fed.*, 40, 2040–2054 (1968); and J. L. Barnard, "Biological Nutrient Removal Without the Addition of Chemicals," *Water Research*, 9, 485–490 (1975)). Only two literature references are known (see Barker et al., "Biological Removal of Carbon and Nitrogen Compounds from Coke Plant Wastes," EPA Report EPA R2-73-167 (Apr. 1973); and P. D. Kostenbader et al., "Biological Oxidation of Coke Plant Weak Ammonia Liquor," *J. Wat. Pollut. Cont. Fed.*, 41, 199–207 91969)) in which high strength ammonia containing wastewater was treated and of these only Barker et al., supra, attempted to achieve nitrification and denitrification. All other attempts to achieve nitrification or a combination of nitrification and denitrification, including that of the inventor herein prior to this invention, have been performed on weak-ammonia coke plant wastewater, i.e., wastewater from a coke plant from which a significant fraction of the ammonia has been stripped. High nitrification efficiencies for ammonia-stripped coke wastewater in a one-stage biological reactor with extended solids residence times has been reported (see A. Bhattacharyya et al., "Solids Retention Time—A Controlling Factor in the Successful Biological Nitrification of Coke Plant Waste," *Proc. 12th Mid-Atlantic Industrial Waste Conference*, Bucknell University, Lewisburg, Pa. (July 1980)).

Further, variable success with a two-stage nitrification-denitrification reactor system on ammonia-stripped coke wastewater has also been reported (T. R. Bridle et al., "Biological Treatment of Coke Plant Wastewaters for Control of Nitrogen and Trace Organics," Presentation at 53rd Annual Water Pollution Control Federation Conference, Las Vegas (Sept. 1980)). Moderate success in nitrifying ammonia-stripped coke wastewater has also been reported by the inventor of the invention described and claimed herein (see Wong-Chong et al., supra). Variable success has also been reported on a two-stage nitrification-denitrification reactor system on ammonia-stripped coke wastewater (see S. G. Nutt et al., "Two Stage Biological Fluidized Bed Treatment of Coke Plant Wastewater for Nitrogen Control," Presentation at the 54th Annual Water Pollution Control Federation Conference, Detroit (Oct. 1981)).

After experimental attempts to biologically treat coke wastewaters containing high ammonia concentrations directly, Kostenbader et al., supra, in experimental work to establish at what ammonia concentrations performance of microorganisms on wastewaters containing cyanide, thiocyanate and COD was affected, concluded that ammonia concentrations in excess of about 2,000 mg/l seriously inhibited the overall performance of biological sludge. In an extremely complex three-stage reaction system (two aerobic stages in series followed by an anaerobic stage), Barker et al., supra, treated high strength coke plant wastewaters for 352 days. Unfortunately, this program led to unsuccessful results. Typical feed ammonia strengths achieved during these experiments were less than 300 mg/l of ammonia (corresponding to about 12-fold dilution of the raw ammonia-containing feed wastewater to be treated) with substantially less that complete nitrification and denitrification. Highest feed ammonia strengths achieved were about 1200 mg/l ammonia (corresponding to a 3-fold dilution with respect to the raw wastewater feed). Treatment at these levels was sustained only for a single two-week period in the entire test program. Highest nitrification and denitrification rates achieved during this relatively high ammonia strength test period were only between 10% and 50%. In view of the results obtained, the project was abandoned.

Good sludge settleability is basic to the proper operation of all activated sludge systems. Activated sludge batch reactor technology can achieve high nitrogen removal through a predominantly co-current nitrification-denitrification reaction environment (Goronszy, M. C., "Single vessel intermittently operated activated sludge for nitrification-denitrification," 51st *Wat. Pollut. Cont. Fed. Conf.*, Anaheim, U.S.A. (1978); Goronszy, M. C., "Intermittent operation of the extended aeration process for small systems," *J. Wat. Pollut. Cont. Fed.*, 51,274 (1979); Goronszy, M. C. and Irvine, R. O., "Nitrification-denitrification in intermittently aerated activated sludge systems and batch systems, *Proc. USEPA International Seminar on Control of Nutrients in Municipal Wastewater Effluents*, 3, 74–117, San Diego, U.S.A. (1980). In so doing, the biomass is exposed to repeated sequences of varying high and low substrate tension (carbon and oxygen) on both macro and micro scales which affect the metabolic reaction pathways. A high biomass substrate storage capacity, through enzymatic transfer mechanisms, is necessary for the control of many species of microorganisms that can contribute to sludge bulking as well as for effective biological phosphorus removal.

Experiments conducted on biomass grown under substrate gradient loading conditions demonstrated experimentally identical soluble substrate uptake (as BOD) and associated specific oxygen utilization response under equivalent aerobic and anoxic-anaerobic floc-loadings (Goronszy, M. C., Barnes, D. and Irvine, R. L., "Intermittent biological waste treatment systems—process considerations," *Water, AIChE Symp. Ser.*, 44, 129–136, (1980). Floc-loading and soluble substrate removal for various wastewaters relative to biological selectivity and sludge bulking control has been correlated (Goronszy, M. C. and Eckenfelder, W. W., "Floc-loading biosorption criteria for the treatment of carbohydrate wastewaters," *Proc. 41st Annual Indust. Waste Conf.*, Purdue University, Indiana, U.S.A. (1986)).

Up to 95% nitrogen removal performance has been demonstrated in full scale cyclically operated batch facilities using cycles of 3 to 8 hours incorporating up to 50% of the cycle as a feed, non-mix, non-react sequence. The relative air-off fraction and subsequent mixing and aeration sequencing was shown to impact upon sludge settlement. It was also shown that anoxic mixing sequences, where soluble substrate concentration and an associated biomass oxygen utilization rate were low, caused a rapid development of sludge bulking conditions. Cyclically operated activated sludge systems generate satisfactory sludge settlement characteristics when operated for carbon removal and nitrification and denitrification.

Biological phosphorus removal is achieved through the selective growth of phosphate accumulating bacteria through the proper allocation of readily degradable soluble substrate to properly sequenced (temporal or spatial) anaerobic-aerobic reaction conditions. This mechanism is also common to sludge-bulking control requirements where residual soluble substrate availability is a major determining factor to filamentous growth. The major difference between that aerobic removal of soluble substrate results in filamentous sludge bulking control, while anaerobic removal of soluble substrate results in biological phosphorus removal while also providing a mechanism for sludge bulking control. To maintain an efficient balance for the two functions, it is necessary to provide substrate storage capacity to meet maximum intended phosphorus removal. These parameters have a variable inter-relationship due to out-of-phase diurnal variations in soluble organic and nutrient input parameters (FIG. 1).

Introduction of nitrate to the anaerobic zone also impacts upon availability of soluble substrate for storage to the amount of about 5 mg COD/mg $NO_3$-N whereby the subsequent aerobic uptake of soluble phosphorus is retarded by the amount of soluble substrate lost for the enzymatic transfer storage reaction. The presence of nitrate also causes an uptake of phosphate concurrently with carbon storage. Other forms of "oxygen" recharge to the anaerobic zone (e.g. $H_2S$) should also be avoided. Anaerobic release of phosphate by substrates that are not carbonaceous is deleterious as the release is not accompanied by an equivalent storage which is necessary for the aerobic uptake sequence. Phosphate uptake has been reported with nitrate in solution (Comeau, V. Rabinowitz, B. Hall, K. J. and Oldham, W. K., "Phosphate release and uptake in enhanced biological phosphorus removal from wastewater," *J. Wat. Pollut. Cont. Fed.*, 59, 707–715 (1987). Operation with denitrifying bio-phosphorus storing bacteria means that co-current phosphate uptake and denitrification can take place in an aerobic zone or sequence.

Biological phosphorus removal has been obtained in fill-and-draw activated sludge operation with sequenced operation to provide the aerobic-anoxic-anaerobic reaction conditions (Ketchum, L. H., Irvine, R. L., Breyfogle, R. E. and Manning, J. F., "A comparison of biological and chemical phosphorus removal in continuous and sequencing batch reactors," *J. Wat. Pollut. Cont. Fed.*, 59, 13–18 (1987). Total operating cycle times of 8.6 hours demonstrated typical phosphorus removal of 3.9 mg/L (4.3 mg/L reduced to 0.4 mg/L) and ammonia removal of 10 mg/L (25 mg/L reduced to 15 mg/L). Considerable phosphorus removal scatter was reported with high observations averaging 1.8±0.75 mg/L above a mean of 0.63 mg/L. Manning, J. F. and Irvine, R. L., "The biological removal of phosphorus in a sequencing batch reactor," *J. Wat. Pollut. Cont. Fed.*, 57, 87–94 (1985) showed the causation of sludge bulking in a batch reactor operated for enhanced biological phosphorus removal could be related to the duration of the anaerobic sequence.

Van Niekerk, A. M., Jenkins, D. and Richard, M. G., "The competitive growth of Zoogleal ramigera and type O2IN in activated sludge and pure culture—A model for low F/M bulking," *J. Wat. Pollut. Cont. Fed.*, 59, 262–273 (1987), demonstrated that the actual soluble substrate concentration available to a mixed culture, rather than an average concentration over 24 hours determined the dominance of floc-former growth in that culture. Specifically Van Nickerk showed that the fate of soluble degradable organics (soluble COD) in wastewater was deterministic to the predominance of type O2IN in an activated sludge. Shao, T. J., "The mechanism and design of anoxic selectors for the control of low F/M filamentous bulking," *Ph.D dissertation*, University of California, Berkeley, U.S.A. (1986) has similarly shown in the impact of soluble COD availability on biological selectivity. The presence of soluble COD and its effect on sludge volume index is graphically demonstrated in FIG. 2. Wanner, J., Ottova, V. and Grau, P., "Effect of an anaerobic zone on settleability of activated sludge," *Proc. IAWPR Cont.*, Rome, Italy 155–164 (1987) showed that the growth of Type O2IN, *Sphaerotilus natans* and *Thiothrix* can be effectively suppressed in systems with anaerobic initial reaction zones provided most of the available substrate is removed under anaerobic conditions. They also showed the selection pressure for these organisms was based on differences in metabolism between filamentous and non-filamentous microorganisms implying that there is no need for a substrate gradient in the anaerobic zones although phosphorus elimination can be enhanced by providing a compartmentalized anaerobic zone. The need for an anaerobic substrate gradient for the control of *Thiothrix* filamentous bulking was also demonstrated.

Following the early work of Chudoba et al., (1973) Goronszy (1977) incorporated a biological selector zone into full-scale continuous inflow sequencing batch activated sludge systems using a transverse partial baffle wall at the inlet end of the reaction basin which formed two zones in continuous fluid communication. While effective filamentous sludge bulking control was demonstrated in over 40 facilities (both industrial and municipal) sludge bulking conditions have been shown to occur in a number of municipal systems (Goronszy, M.

C., "Nitrogen removal and sludge bulking control in cyclically operated activated sludge systems," *Ohio Wat. Pollut. Cont. Assoc. Conf.*, Akron, U.S.A. (1987).

SUMMARY OF THE INVENTION

An improved sequential cycle, activated sludge sewage treatment process is disclosed. The raw sewage is received into a sewage treating basin in first zone into which activated sludge is mixed and retained for a period sufficient to form a non-bulking sludge and absorb biodegradable dissolved compounds into the activated sludge. The thus treated sewage is then aerated and subjected to a quiescent condition to permit settling of the sludge in a zone characterized in that it has less than approximately twenty percent of the biochemical oxygen demand of the original sewage and where in the sludge is non-bulking. Treated sewage sewage is decanted from the upper portion of the basin after allowing the sludge to settle, and cyclically repeating the process. The improvement involves anaerobically fermenting the influent sewage and recycling anaerobically fermented partially treated sewage to the input of the influent sewage. The process is carried out such that the anaerobic fermentation is carried out in an initial zone and a secondary zone. The process provides for recycling anaerobically fermented partially treated sewage from the secondary zone to the initial zone. The process is preferably carried out without substantial mixing in the initial zone after the initial injection and mixing of activated sludge and recycle fermented partially treated sewage into the influent sewage, and preferably wherein the flow in the initial zone is substantially plug flow.

The invention is an improved a serial multiple zone sludge sewage treatment process wherein sewage is received into a first sewage treating zone into which activated sludge from the last zone is mixed and retained in the first zone and then in a secondary zone for a period and then retained in a subsequent zone and aerated and subjected to a quiescent condition to permit settling of the sludge in said subsequent zone, the final zone being zone characterized in that it has less than approximately twenty percent of the biochemical oxygen demand of the original sewage and where in the sludge is non-bulking. According to the improved process mixing the influent sewage with activated sludge from the final zone and with anaerobically fermented partially treated sewage and maintaining the mixture in an anaerobic condition to permit enzymatic uptake of soluble carbon containing compounds by the sludge. The anaerobic fermentation in the initial zone is carried out without substantial mixing after the initial injection and mixing of activated sludge and recycled fermented partially treated sewage into the influent sewage.

The invention also contemplates a sewage processing system comprising three treatment zones, means providing fluid communication from the first zone to the second zone and from the second zone to the third zone, means for mixing activated sludge from the third zone and partially treated sewage from the second zone with influent sewage into the first zone, means for operating the first zone anaerobically without substantial mixing and means for operating the second zone anaerobically with substantially anaerobic mixing. Preferably the means for operating the first zone anaerobically comprises means for passing the influent sewage mixed with activated sludge and partially treated sewage through the first zone in a substantially plug flow regimen.

The invention embodies a three-zone variable volume cyclic sewage treatment process comprising the steps of inflowing sewage into an initial zone, mixing activated sludge and anaerobically partially treated sewage with the inflowing sewage, retaining the mixture of inflow sewage, activated sludge and recycled anaerobically partially treated sewage in the initial zone under anaerobic, substantially fermentation conditions for a period sufficient to permit substantial enzymatic uptake of soluble carbon containing substrate by the activated sludge, passing the thus treated mixture from the initial zone to a second zone, retaining the last said mixture in the secondary zone under anaerobic fermentation conditions for a period of from about 0.3 to about 3 hours, passing the thus treated mixture from the secondary zone to an aeration zone, and cyclically aerating the mixture in the third zone, allowing the mixture in the third zone to settle, and decanting treated sewage as supernatant from the third zone. The process being characterized in that enzymatic transfer soluble carbon substrate compounds from the liquid phase into the biomass takes place sufficiently to permit uptake of phosphorous by the biomass in the aerated zone, the growth of non-filamentous sludge producing organisms is favored over the growth of filamentous sludge producing organisms, the concentration of the residual soluble carbon substrate compounds measured as COD is about 30 mg/L or less, non-bulking sludge is produced, phosphorous removal is effected, and cocurrent nitrification and denitrification during the aeration portion of the cycle

BRIEF DESCRIPTION OF THE DRAWINGS

FIG. 3, comprising subsidiary

FIG. 6 depicts $NO_3$-N & $NII_3$-N concentration as a function of time during the same single cycle of the cyclic operation of the process of this invention to remove phosphorous.

FIG. 7 depicts $PO_4$ concentration as a function of time during a single cycle of the cyclic operation of the process of this invention to remove phosphorous.

FIG. 8 depicts the concentration of $COD_S$, $PO_{4S}$, and $NO_3$-N as a function of time during air on and air off sequences while mixing the contents of the reactor.

FIG. 9 depicts the concentration of $COD_S$, $PO_{4S}$, and $NO_3$-N as a function of time during air on and air off sequences without mixing the contents of the reactor.

DESCRIPTION OF THE PREFERRED EMBODIMENT

Figure 1A:
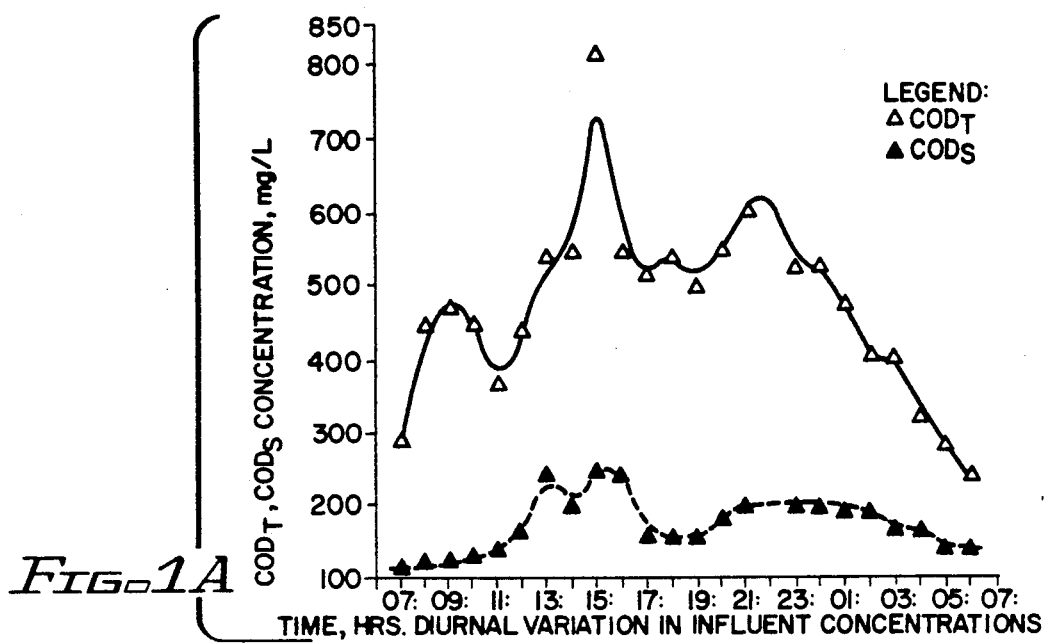
FIG. 1 depicts the out-of-phase diurnal variations in soluble organic and nutrient input parameters which may be encountered in a typical sewage processing installation.

A system which will accomplish carbon removal, nitrification and denitrification and biological phosphorus removal without sludge bulking requires consideration of availability of readily degradable soluble substrate in connection with the following factors:

Floc-forming microorganisms have an affinity to store soluble substrate where storage capacity is not limited.

(1) The availability of polyphosphate reserves can limit the extent of soluble substrate uptake where high concentrations of available substrate are present.

(2) Maximum aerobic phosphate uptake requires maximum soluble substrate uptake and storage in the anaerobic zone.

(3) Substrate storage capacity can be defined in terms of floc-loading relative to the fraction of soluble substrate which is enzymatically transferable.

(4) Soluble organics will remain when:
  (a) Loss of biological phosphorus removal capacity through a shift in population dynamics occurs causing an availability of soluble substrate, which is available for use by filaments as low substrate concentration.
  (b) Efficiency loss of soluble substrate removal occurs due to applied loading shifts (higher concentrations) and insufficient aeration of the biomass.
  (c) Loss of mean floc-loading conditions which favor floc-growth occurs.
  (d) Gradual loss of process oxygen availability caused by seasonal temperature increase.

This invention is a process designed to accomplish the aforementioned objectives, and, in one preferred embodiment, constitutes an improvement over the new cyclic activated sludge system which I developed previously which enhanced system flexibility and allowed for the additional process control to effectively manage growth conditions which are necessary for the proliferation of floc-forming microorganisms, as described in U.S. Pat. No. 4,663,044, the disclosure of which is incorporated herein be reference.

The process of the invention is carried out in three reaction zones which are preferably in a single basin variable volume reactor operated as a sequencing batch reactor through the respective zones. The reaction zones are in continuous fluid communication with each other obviating the necessity for multiple liquid-head bearing walls but separated from one another by baffles to provide separate and distinct reaction zones. The process, per se, could be carried out in three separate reactors; however, to do so would greatly increase the capital and operating costs without gain in efficiency.

The initial reaction zone is an anaerobic reactor. This initial zone can be designed for constant volume operation but considerable savings in cost are effected by carrying out the anaerobic process in this zone as a variable volume reactor, along with the variable volume operation of the subsequent zones. The initial reaction zone is preferably divided into sub-reaction zones by a series of underflow and overflow baffles to accomplish, in effect, plug-flow without substantial mixing of the input sewage in the initial reaction zone.

The secondary reaction zone is a non-aerated mixed reaction zone which, like the initial reaction zone, can be operated as a constant volume zone but is preferable operated as a part of an overall variable volume reactor. The secondary reaction zone is also an anaerobic reaction zone but it is separate from and differs from the initial reaction zone in that the secondary reaction zone is mixed and is generally homogeneous.

The final zone is a sequentially aerated and non-aerated reaction zone in which the co-current nitrogen-denitrification reactions are carried out.

The process of this invention is characterized, inter alia, by the inclusion of an initial anaerobic zone in which the inflow sewage is subjected to anaerobic treatment in mixture with activated sludge and recycled anaerobically treated sewage. This initial anaerobic zone serves a dual purpose. First, it provides a reaction zone for usage of soluble substrate which may leak through from the initial influent. This can be caused by diurnal change in influent concentration conditions. The recycle from the secondary anaerobic zone is variable. During operation in this mode there is no fermentation taking place. Two factors influence this type of operation—too high a concentration of soluble substrate (COD) in the influent and reaction conditions within the main aeration zone whereby the sludge:feed ratio is out of balance and/or the sludge to feed ratio is in balance but the sludge has not been given sufficient time to regenerate a high enough enzymatic transfer and storage capacity of soluble substrate. Secondly, this initial zone serves as a fermentation zone when additional soluble substrate is required for the biological phosphorus transformation reactions.

The volume ratio of the recycled partially anaerobically treated stream to the influent is a function of the leakage of soluble substrate from the initial zone into the subsequent zones and the kinetics of soluble substrate formation in the particular zone. This ratio is best approached using two scenarios. In the first such scenario, there is sufficient soluble substrate already in existence in the influent sewage to meet the critical soluble substrate:phosphorous ratio to support the phosphorous transformation reactions. Depending on the nature of the soluble substrate, approximately 10-15 parts of soluble COD per part of phosphorous is generally considered critical in most municipal sewage treatment plants. Under other circumstances, the recycle is sufficient to assist with oxygen depletion of the inflow streams into the initial zone. The recycle flow is variable and is set as required during operation of the process. The recycle flow rate is set to offset dissolved oxygen in the sludge recycled from the main aeration zone, when dissolved oxygen in that zone is elevated as it is during the "air on" portion of the cycle, as described in the aforesaid U.S. Pat. No. 4,663,044. Briefly, the dissolved oxygen concentration is very low, near zero, at the initiation of the "air on" cycle, and rises to an intermediate level which remains substantially constant for a period of time depending upon the oxygen demand of the sewage then increases sharply as the oxygen demand of the sewage is depleted to the oxygen-saturation level of the sewage. The profile of this cycle is organic load sensitive, hence the return stream for minimizing the effects of over aeration in the main aeration zone and the aerobic/anaerobic enzymatic transfer of soluble substrate in the in the inlet zone. Similar effective control can be brought about by a dissolved oxygen sensing control system in the main aeration basin to ensure adequately low dissolved oxygen concentrations. This dissolved oxygen profile is also important to the cocurrent nitrification-denitrification reaction mechanisms which take place in the main aeration zones. If the dissolved oxygen level is very low and the specific oxygen utilization rate of the sludge is sufficiently high, diffusion of dissolved oxygen into the microparticles of sludge may be very limited and incomplete. In a second case, when the dissolved oxygen is very high relative to the specific oxygen utilization rate of the biomass, the oxygen may penetrate substantially all of the microparticles of sludge and maximizes micro-aerobic reaction within the biomass, and become an impediment to the co-current reaction mechanism. The flow volume ratios are typically up to 0.5 recycle from the secondary zone to 1.0 part of influent flow to the initial zone. A higher recycle rate is deemed necessary where there is a higher passage of soluble substrate from the initial zone to the secondary zone.

Recycle from the main aeration zone accords with a number of parameters, i.e.:

(1) Floc-Load where:

$$\text{Floc-load} = \frac{fS_o}{X_d X_v X}$$

wherein:
- f = Substrate coefficient, less than 1, specific to the particular sewage under treatment.
- $S_o$ = Concentration of soluble substrate, i.e. COD contributing constituents which will pass through an 0.45 micron membrane filter.
- $X_d$ = degradable fraction of biomass.
- $X_v$ = Volatile fraction of biomass.
- X = Concentration of biomass.

(2) Diurnal load variations to the facility, which affects the total value of $S_o$ which flows into the facility.

(3) The state of the biomass in the main aeration zone (X) and the capacity to partake in the enzymatic substrate transfer reactions. This relates directly to the amount of storage capacity which is available which can be gauged from the specific oxygen utilization rate of that biomass.

(4) The amount of soluble substrate transfer that takes place to ensure that leakage (passage) of substrate from the secondary zone to the main aeration zone is minimal and does not exceed about 80 µ/L.

Short term overloads in substrate leakage are permissible but should not exceed more than about two-tenths (2/10) of the duration of the aeration sequence in each cycle of operation.

Operating parameters are dependent upon multiple interactive variables. These variables are controlled to achieve a substrate concentration leakage into the main aeration zone of <(15–20 mg/g)X, assuming the biomass (X) has attained its near maximum storage capacity whereby the specific oxygen utilization rate response to the floc-load reaction condition exceeds about 2.5 to 1 uptake response of an anaerobic balance reaction condition and reflects a potential for oxygen utilization when that balance is applied to aerobic reaction conditions.

Time is not defined, per se, as it is a reaction correction and it is kinetics which determine time. For practical purposes, but not as a limiting parameter, a net time of about twenty to thirty minutes in the initial zone, including all recycle streams, is usually adequate.

For most domestic sewage where influent COD ($COD_T$) is of the order of 600 mg/L and influent soluble COD ($COD_S$) up to about 150 mg/L, the inlet zone may have from two to six or more sub-compartments, about four sub-compartments generally being optimal, all in fluid communication, divide from each other by overflow and under-flow baffles, or of a generally equivalent construction. Preferably, each compartment is fitted to permit introduction of air if operation in a mode other than as described is desired for handling different influent, as well as being fitted to permit introduction of recycle sludge from the main aeration basin and/or from the secondary treatment zone, as required to attain the optimum nitrogen-denitrification conditions in the main aeration zone.

In order to achieve best possible solids-liquid separation it is necessary that the biomass contain a relatively small portion of the non-flocculating type of organisms. This enhances the ability of the biomass to entrap coarse, fine and colloidal particulate matter which, if not removed in the solids-liquid separation unit operation, requires a separate costly filtration or other type of process unit operation for its removal. The nature of the non-flocculating biomass enables strong solid bridging mechanisms, with high intra solid attractive forces assisted by micro particulate biocoagulation involving extra cellular polymer compounds, to take place within the biomass. The absence of some non-flocculating microorganisms in the biomass leads to pin-point type of sludge or to a type that results in a turbid liquid layer during and following the settling operation. This also means that the efficiency of the process is reduced necessitating the addition of other processes or unit operations to remedy the deleterious situation. One solution to poor solids-liquid separation has been to increase the area and liquid depth of the solids-liquid separation unit and thus the hydraulic retention time of the unit. There is a limit to the hydraulic retention time that can be used in practice due to anaerobic and/or anoxic biological transformations which can take place within the biomass. Too low a solids flux combined with too long a period whereby the biomass is in a non-aerobic condition only leads to a further loss in process efficiency and cost effectiveness due to the need to use additional processes or unit operations.

In conventional activated sludge wastewater treatment methodology two flow configurations can be described, complete mix or plug-flow. Tracer studies to determine hydraulic residence time distributions and dispersion number characteristics, a dimensionless number describing diffusive mixing and transport, essentially describe the flow predominance of the configuration. A dispersion number of or near to 0 essentially describes a plug-flow configuration while a large value of the dispersion number, approaching infinity, describes an essentially completely mixed configuration. Activated sludge systems operating, or predominantly operating, in the complete mix configuration are very prone to generation of sludges which bulk and which are identified as having a low zone settling velocity i.e. poor solids-liquid separation. Such configuration is specially unsuited to the treatment of readily degradable food processing types of wastes or to domestic wastewaters where a high level of ammonia removal is required. In such cases bulking sludge or biomass exhibiting poor solids-liquid separation severely limits the efficacy of the process.

The hydraulic residence time distribution can also be used to fit various hydraulic models, which also describe the degree of plug-flow, in the form of a certain number of smaller completely mixed reactors connected in series which in total exhibit the plug-flow behavior. An equivalent four reactors in series is known to approximate a plug-flow hydraulic configuration. Added to this type of model is the ability to be able to describe, bypass, backmix, bypass and dead volume fractions in the flow configuration.

Wastewaters are characteristically described by parameters which quantify their oxygen consuming potential, solids content and the availability of other essential nutrients necessary for a healthy and efficiently operating biological treatment process. The concentration terms in domestic wastewaters are a function of the volume ratio of water that is used to transport the wastes to the treatment facility, the diet of the population contributing to the system and the residence time of the combined water and wastes in the sewage system. The principal treatment parameters are hence the carbonaceous oxygen consuming fraction (or organics) variously determined as BOD (Biochemical Oxygen Demand), COD (Chemical Oxygen Demand), and the nitrogenous oxygen consuming fraction described as TKN (total Kjeldahl nitrogen), organic nitrogen, ammonia nitrogen or free and saline ammonia, and nitrite nitrogen. These parameters can be used as a measure of the soluble, colloidal and particulate forms and their various fractions. For example, domestic wastewaters may have an associated BOD and a suspended solids content ranging from some 350 mg/L to a low value of about 90 mg/L for each parameter depending on the amount of water in the carrier system. TKN is similarly variable from about 80 mg/L to lower concentrations. On a practical basis, particulate matter contributes to about 50% of the BOD (or other parameters). The soluble and colloidal matter makes up the other 50% with the colloidal fraction contributing about 15%. Domestic sewage may contain less than about 60 mg/L of soluble BOD (or other parameter).

The characteristics of industrial wastewaters are a function of the process they are derived from. Industrial wastewaters from the food industries, such as potato, milk, vegetable, brewery industries have a high BOD (or other parameter) in which the soluble fraction also leads to a high BOD (or other parameter) in the range of 200 to 2000 mg/L. Wastewaters having a total BOD (or other equivalent parameter) in excess of about 3000 mg/L are generally not economically amenable to biodegradation by an aerobic process alone such as the activated sludge process. For the purposes of demonstrating this invention, a typical domestic wastewater having a total BOD of about 300 mg/L will be considered; however, the invention and its application is not limited to this strength or type of waste.

It is generally observed that BOD removal by the activated sludge and other biological processes takes place by storage, synthesis and oxidation mechanisms in which all three processes can be enhanced, the extent of which is determined by the net hydraulic flow configuration. Absorption of soluble substances (organics) by microorganisms is thought to take place by enzyme transport together with diffusive mechanisms. It is a rapid interaction, the amount of which is determined by the ability of the active organisms of the biomass to absorb; the latter is functional on the population of intra and extra cellular enzymes that are available, the fraction of receptive transport sites or centers associated with the microorganisms, the fraction of previously absorbed material that remains in an unmetabolized state, i.e. the concentration driving forces, all of which are related to the active mass fraction of the biomass.

The active mass fraction has sometimes been described as the viable fraction or the degradable fraction. This invention provides a process whereby the degradable fraction property of biomass and its ability to absorb soluble substrate is maximized.

The transport of soluble substrate (organics) by enzymatic mechanisms, or absorption, is an energy intensive reaction, the magnitude of which can be shown by the specific oxygen uptake rate (SOUR) of the biomass before and after substrate contact. Synthesis reactions and cellular growth do not necessarily occur on the onset of absorption. Cellular growth mechanisms do not begin to function for some considerable time lag after absorptive transport saturation as can be evidenced by cellular Adenosine Tri-Phosphate (ATP) concentrations.

It has been mentioned that the absorption potential or efficiency of a biomass is measurable by the initial magnitude of and the resulting elevation of the specific oxygen utilization rate (SOUR) of that biomass. The absorption potential of a biomass is also functional on the fraction of that biomass that is active and degradable, the latter being determined by the organic loading or mean cell residence time of the biomass.

The magnitude of the elevation in the SOUR bioprofile is also dependent on the initial substrate to biomass ratio termed the floc-load (F). Units of floc-load are described as mg BOD, COD, TOC, PV per g biomass. Biomass may be described as mixed liquor suspended solids (MLSS), mixed liquor volatile suspended solids, (MLVSS). The degradable mass of either MLSS or MLVSS on the surface or near surface layers of biomass in an attached growth system expressed in the same terms of oxygen utilization provides a measure of the substrate saturation capacity of that particular biomass. The initial absorption mechanism is quick, the major fraction of substrate transport taking place in only about 10 to 20 minutes. Little absorption takes place after about 45 minutes.

Figure 5:
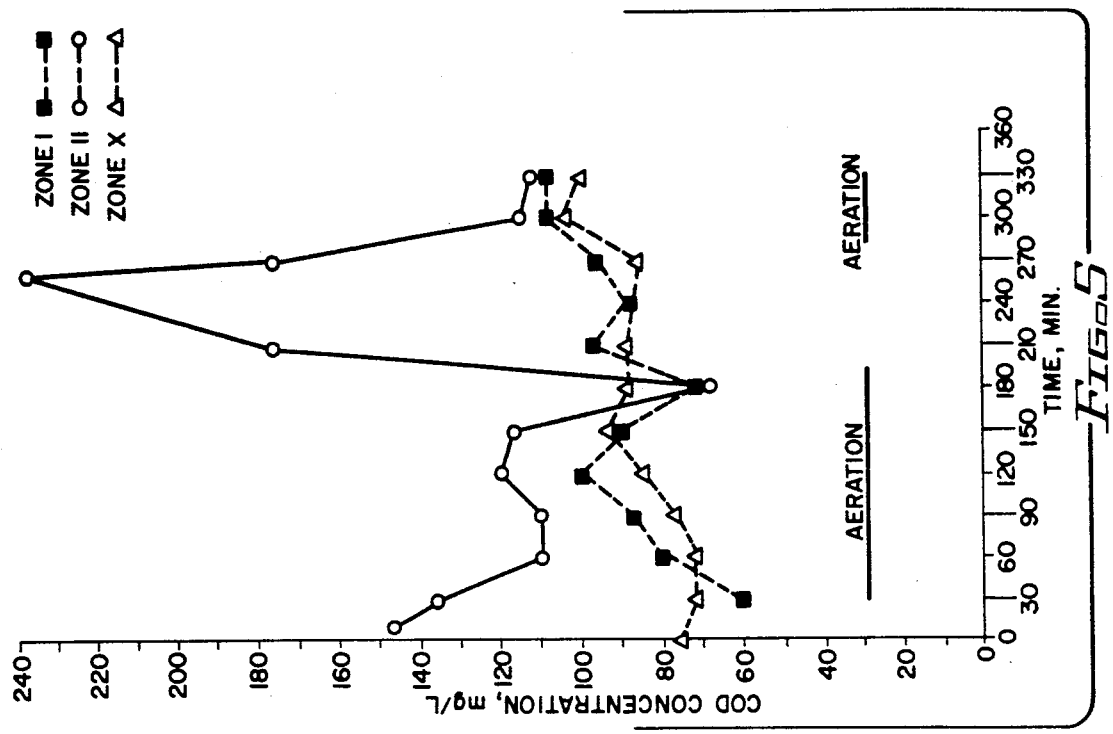
FIG. 5 depicts COD concentration as a function of time during the same single cycle of the cyclic operation of the process of this invention to remove phosphorous.
Figure 4:
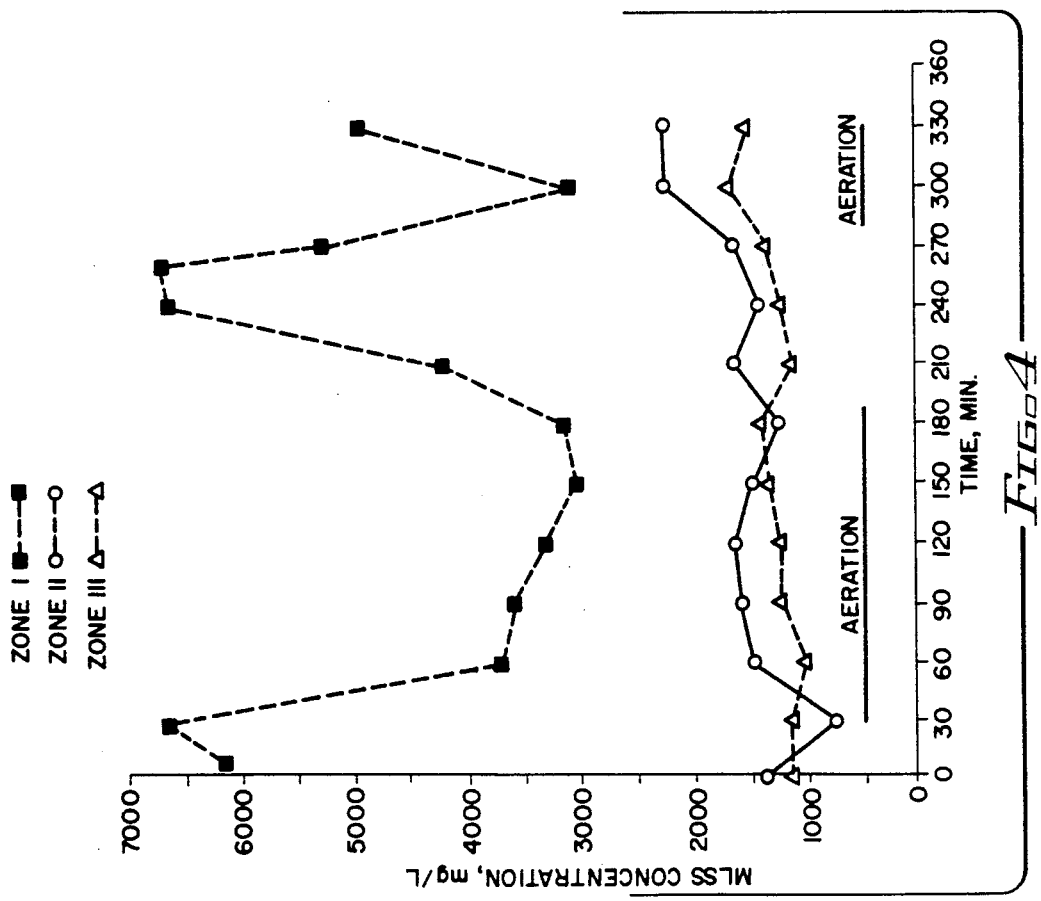
FIG. 4 depicts MLSS concentration as a function of time during a single cycle of the cyclic operation of the process of this invention to remove phosphorous.

The percentage removal and floc-load relationship is waste specific and also functional on the active or degradable fraction of the biomass and the relative magnitude of SOUR existing on initiation of absorption mechanisms with respect to the magnitude associated with viable biomass in a nonabsorption state viz initial value of SOUR. The absorption potential of a biomass is limited in the first instance, as shown in FIG. 5, by the active or degradable fraction of the biomass, by the floc-load and by the availability of receptor transfer sites or storage capacity for that degradable fraction of biomass.

Extended periods of aeration of the contacting biomass or contacting of biomass which has experienced prolonged periods without the presence of oxygen reduces the absorption potential of that biomass.

The magnitude of percent of substrate absorbed, relative to the criteria described above, at a specific floc-load is instrumental in determining the sludge settling characteristics of the biomass following conventional aeration periods.

Reference is made to the following publications for further background.

"Oxidation Ditches in Wastewater Treatment," Barnes, D., Forster, C. F., Johnstone, D. W. M., Pitman Press, Bath, Avon, U. K.

"Development of the Passveer Extended Aeration System," Batty, J. A., Goronszy, M. C., Clarke, R., *The Shire and Municipal Record* (Australia), Nov. 1974.

"Control of Activated Sludge Filamentous Bulking," Chudorba, J., Grau, P. Ottova, Blaha, J., Madera, V. *Water Research*; Part I, Vol. 7, pp. 1163–1182; Part II, Vol. 7, pp. 1389–1406; Part II, Vol. 8, pp. 231–237 (1973).

"Single Vessel Activated Sludge Treatment for Small Systems," Goronszy, M. C., *Journal WPCF*, Vol. 51, pp. 274–287; presented Oct. 6, 1977, 50th Annual Conference of the Water Pollution Control Federation, Philadelphia, Pa.

"The Activated Sludge Process: State of the Art," W. Wesley Eckenfelder, Jr., et al., *CRC Critical Reviews in Environmental Control*, Vol. 15, Issue 2, 1985.

"Principles of Water Quality Management," W. Wesley Eckenfelder, Jr., *CBI Publishing Company, Inc.*, Boston (1980).

The foregoing publications describe the basic theory and operation of the activated sludge process and the extended aeration process for treatment of sewage.

The invention relates generally to improvements in the treatment of municipal sewage and/or industrial wastewater using dispersed growth and/or attached growth biomass. The invention enables a high quality effluent to be generated whereby substantial biological denitrification and phosphorus removal is far more consistently achieved than is achieved in the process of U.S. Pat. No. 4,663,044.

This invention provides a method for achieving in a minimum of three successive stages of biomass absorption in a reaction vessel phosphate and nitrogen removal while avoiding sludge bulking.

As in the process of U.S. Pat. No. 4,663,044 the last two zones of the reaction vessel are operated with repeated sequences of aeration and nonareation which, combined with the maximization of biomass absorption mechanisms in a series arrangement, provides a method of wastewater treatment that is superior to existing conventional, intermittent activated sludge and sequencing batch reactor methodology; however, the initial captive selector was modified to maintain and to permit variation of floc-loading using mixed liquor from the main aeration zone. The feed protocol is also varied to permit operation of the batch reactor at higher loadings without the short-circuiting that was demonstrated to occur with the continuous inflow feed protocol systems. The captive selector is contiguous to the batch reactor and operates over the same variable depth as the main reactor basin. It can be operated as either an aerobic or an anoxic-anaerobic zone depending upon the effluent quality parameters the system is required to achieve. This configuration permits variation of the floc-load conditions in order to achieve proper loading of the selector to achieve a high level of microbial activity, a sharp soluble substrate gradient and minimal leakage of the readily degradable soluble substrate fraction. In this way substrate storage mechanisms, as opposed to substrate degradation mechanisms, can be maximized at variance.

As mentioned, the biomass associated with biological phosphorus removal in activated sludge plants frequently exhibits poor settleability. Biological selectivity mechanisms that are necessary for floc-former predominance and phosphorus accumulating microorganisms can be subjected to shifts which can ultimately result in filamentous overgrowth, poor sludge settlement and a loss of biological phosphorus removal performance. Influent wastewater loading parameters can vary widely whereby the important parameters of flow, readily degradable soluble carbon, soluble phosphorus and readily oxidizable nitrogen fractions are out of phase.

According to this invention, novel batch reactor technology can be used to minimize the impact of these interactive effects to achieve substantial biological nitrogen and phosphorus removal. Operational protocols for a cyclically operated activated sludge system which achieves co-current nitrogen and phosphorus removal without filamentous sludge bulking.

The studies described hereinafter were conducted at the Irvine Ranch Water District's (IRWD) water reclamation facility (60000 m$^3$/d) in California. Studies were carried out in a cyclically operated batch reactor having a top water volume of 29.5 m$^3$ and designated top and bottom water levels of 2530 mm and 1700 mm, respectively. The system is shown schematically in FIG. 3 and was configured with:

1. An initial non-aerated anaerobic reactor, with a top water level volume of 5.34 m$^3$, divided into 8 volumes by consecutive under and overflow partial baffles (designated as zones 3 to 10), arranged for constant or variable volume operation.

2. A non-aerated mixed secondary reaction zone of variable hydraulic retention time, arranged for constant or variable volume operation (designated as zone 2).

3. A final zone which is sequentially aerated and non-aerated in accordance with the applied organic loading and nitrification-denitrification objectives (designated as zone 1).

All three zones were in continuous fluid communication and together constituted the single basin variable volume reactor (sequencing batch reactor). The sequences for operation of the mechanical equipment were controlled by a programmable logic controller which provided a repetitive cycle of sequences for aeration, settle and surface skim (effluent removal). The facility was set to operate on a 4-hour cycle with essentially 2½ hours aeration (feed), 1 hour settle (feed and no feed protocols), 20 minutes surface skimming and 10 minutes idle (feed). A sludge line enabled mixed liquor to be directed to zone 3 in the flowsheet. The flow of mixed liquor was determined in a V notch flow divider with the excess flow being returned to zone 1.

Raw sewage was pumped from the influent channel of the main facility to a V notch flow divider and then to zone 3. An internal recycle loop was provided around the non-aerated zone 2 with flow directed to the zone (3–10) volume. Air flow to the aerated zone 1 was measured and regulated with a rotameter to maintain a basin dissolved oxygen concentration of less than 2 mg/L at the end of the aeration sequence. Two feed protocols were examined whereby the same volume of waste was treated per day. The first protocol required the volumetric loading to be received over the aeration and idle sequences only. Hydraulic retention time (HRT) in zone (3–10) was 40 minutes and zone 2 (referenced to designated bottom water level) was 56 minutes. Total HRT (referenced to designated bottom water level) was 9.5 hours composed of 6.5 aerobic hr/d and 3.0 anoxic/anaerobic hr/d. The second protocol involved the same hydraulic load over the aeration, settle and idle sequences. The reduced flow rate resulted in a HRT in zone (3–10) of 53 minutes for a total system HRT of 9.7 hours composed of 4.7 aerobic hr/d and 5.0 anoxic/anaerobic hr/d (relative to designated bottom water level).

Figure 1B:
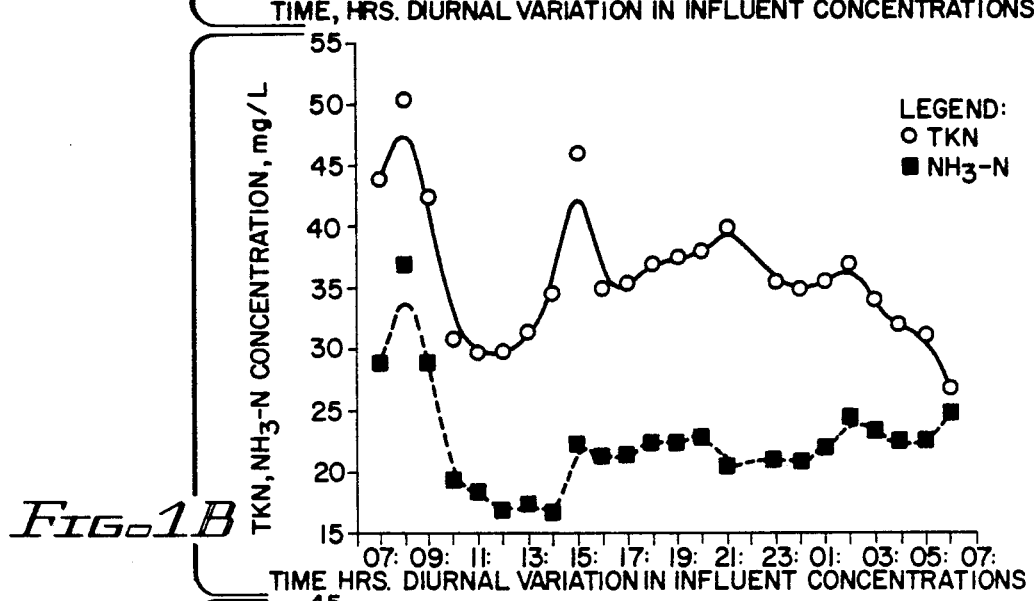
Figure 1C:
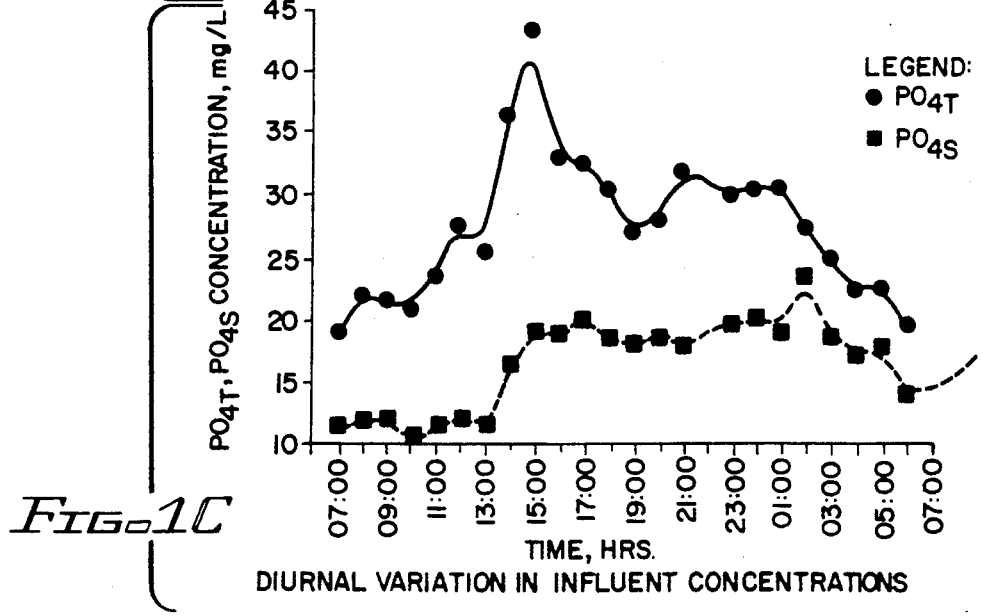
Figure 2:
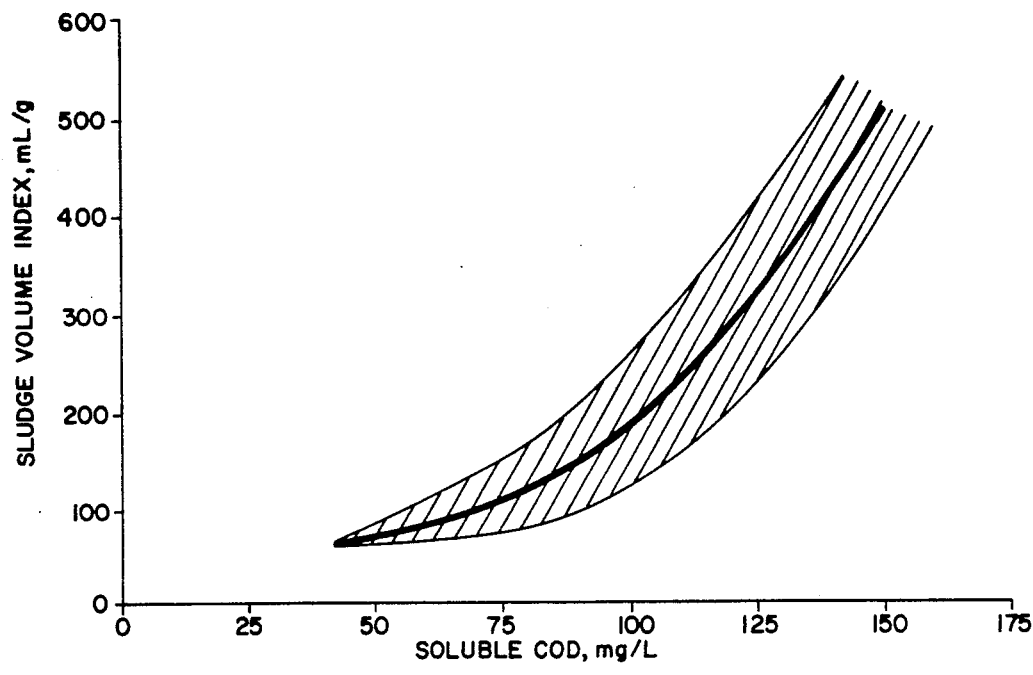
FIG. 2 depicts the effect of COD on sludge volume index in an activated sludge system.
Figure 3A:
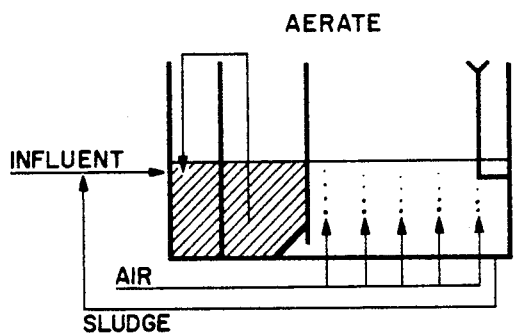
FIGS. 3A, 3B, 3C and 3D, depicts schematically the arrangement of the processing zones according to the present invention and the batch reactor configuration for co-current nitrogen and biological phosphorous removal according to the present process. The zones marked with the diagonal hatching are anaerobic. The cross-hatched zone indicates the settled sludge biomass.
Figure 3B:
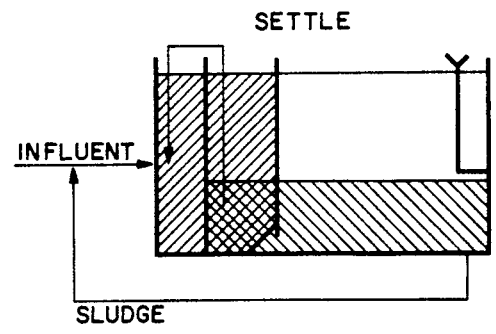
Figure 3C:
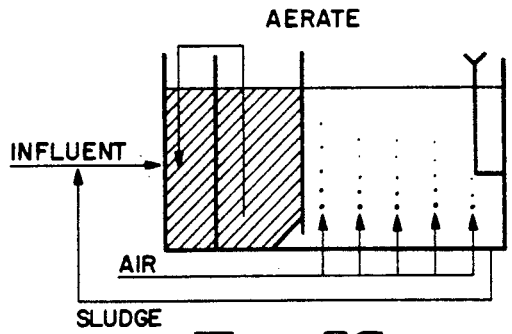
Figure 3D:
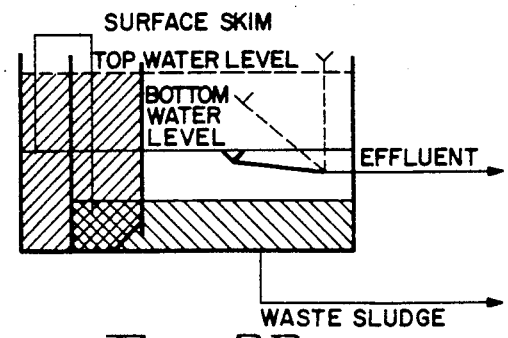

The demonstration unit was seeded with sludge from the IRWD conventional activated sludge facility. Typical diurnal loading conditions are shown in FIG. 1. Daily and hourly statistical data are summarized in Table 1.

tion conditions were either initially preserved using mercury salts or concentrated sulfuric acid (to pH2) and centrifuged at 1800 G for 10 minutes prior to membrane filtration. Selected ion concentrations in the treated effluent over the period of the study are summarized in Table 2.

TABLE 1
MEAN INFLUENT WASTEWATER CHARACTERISTICS

|  | $COD_T$ mg/L | $COD_C$ mg/L | $COD_S$ mg/L | TKN mg/L | $NH_3$-N mg/L |
|---|---|---|---|---|---|
| Daily | 450 ± 70 | 36 ± 6 | 100 ± 7.5 | 35 ± 3.8 | 14.6 ± 0.9 |
| Diurnal | 480 ± 12.0 | 50 ± 21 | 184 ± 40 | 36.3 ± 6.2 | 16.4 ± 3.7 |

|  | $PO_{4S}$ mg/L | $PO_{4T}$ mg/L | SS mg/L | VSS mg/L | BOD mg/L |
|---|---|---|---|---|---|
| Daily | 14.6 ± 0.9 | 24.4 ± 1.5 | — | — | 200 ± 40 |
| Diurnal | 16.4 ± 3.7 | 17.1 ± 5.9 | 188 ± 30 | 116 ± 16 | — |

Track runs were carried out to determine facility performance over single and consecutive cycles over 24-hour periods. When appropriate, samples were collected to show proces interactions between the various zones in the system. Additional data were obtained from bench-scale reactors relative to nitrification-denitrification and phosphorus release-uptake mechanisms. Fermentation reactions for nitrate removal, phosphorus release and soluble COD tracking were conducted in a magnetically stirred 2-liter plexiglass cylindrical reactor fitted with a close fitting polystyrene floating cover was also fitted with a port for temperature measurement and sample collection. Batch reactor floc-loading reaction sequences were examined using a 20 liter capacity reactor (dimensions 4000 mm × 200 mm × 200 mm). Ceramic diffuser stones were used for mixing and aeration. Parameters analyzed in both the demonstration unit track runs and supportive laboratory studies included, mixed liquor suspended solids (MLSS), volatile suspended solids (BSS), Kjeldahl nitrogen (TKN), ammonia nitrogen ($NH_3$-N), total phosphate ($PO_{4T}$), soluble phosphate ($PO_{4S}$), total chemical oxygen demand ($COD_T$), colloidal chemical oxygen demand ($COD_C$), soluble chemical oxygen demand ($COD_S$), biochemical oxygen demand (BOD), dissolved oxygen (DO), oxygen uptake rate (OUR), sludge settled volume (SSV) and turbidity. Temperature (°C.) was recorded for all kinetic studies. Soluble COD and $PO_4$ were determined as that fraction which passed a 0.45 micron membrane filter. The colloidal COD fraction was determined by substraction of the soluble COD and the fraction which passed a glass fiber filter. Soluble parameters associated with MLSS reac-

TABLE 2
SELECTED ION CONCENTRATIONS IN TREATED EFFLUENT

| $Ca^{++}$ mg/L | $Mg^{++}$ mg/L | $K^+$ mg/L | $Na^+$ mg/L | $B^-$ mg/L | $F^-$ mg/L | $SO_4^=$ mg/L | $Cl^-$ mg/L |
|---|---|---|---|---|---|---|---|
| 68.8 ± 5.5 | 31.9 ± 3.0 | 19.2 ± 4.7 | 136 ± 16 | 0.38 ± 0.09 | 0.40 ± 0.09 | 240 ± 19 | 146 ± 36 |

The demonstration facility was operated for an 8-month period. Loading parameters relative to the typical diurnal loading in FIG. 1 are shown for each of 6 cycles as an equivalent daily load in Table 3. These were typical loadings for a feed protocol during aeration, settle and idle where 44 kg VSS were held in the basin. COD and nitrogen loadings are also expressed as an equivalent aerobic loading (g/g/$d_A$ and mg/g/$d_A$, respectively) considering that the aerobic fraction in a cycle was 0.625.

TABLE 3
EQUIVALENT DAILY LOADING PER CYCLE

|  | $COD_S$ | | $COD_T$ | | TKN | | $NH_3$-N | | $PO_{4T}$ | $PO_{4S}$ |
|---|---|---|---|---|---|---|---|---|---|---|
| Cycle | g/g/d | g/g/$d_A$ | g/g/d | g/g/$d_A$ | mg/g/d | mg/g/d | mg/g/d | mg/g/$d_A$ | mg/g/d | mg/g/d |
| 1 | 0.17 | 0.27 | 0.53 | 0.85 | 45.4 | 72.9 | 31.1 | 46.6 | 26.8 | 14.1 |
| 2 | 0.25 | 0.40 | 0.62 | 0.99 | 40.4 | 64.6 | 21.7 | 34.8 | 39.4 | 17.9 |
| 3 | 0.23 | 0.36 | 0.64 | 1.03 | 39.3 | 62.9 | 26.3 | 42.1 | 36.9 | 22.8 |
| 4 | 0.24 | 0.38 | 0.68 | 1.09 | 45.7 | 73.0 | 25.9 | 41.4 | 36.3 | 22.8 |
| 5 | 0.24 | 0.38 | 0.55 | 0.88 | 42.4 | 67.9 | 27.1 | 43.4 | 34.4 | 24.5 |
| 6 | 0.19 | 0.31 | 0.35 | 0.55 | 37.3 | 59.6 | 28.2 | 45.1 | 25.9 | 19.9 |
| Mean | 0.22 | 0.35 | 0.56 | 0.90 | 41.8 | 66.9 | 26.7 | 42.7 | 33.3 | 20.3 |

Bottom and top water level VSS concentrations were 2790 mg/L to 1820 mg/L at this loading condition. Solids settled volume averaged 35% after 60 minutes of settling. Typical effluent quality for this loading condition is summarized in Table 4. Effluent quality data for the sunsequent 6 cycles are summarized in Table 5. The same influent loading conditions were maintained but with 18.7 kg VSS in the basin to simulate a short term doubling of load. Bottom and top water level VSS concentrations were 1275 mg/L and 830 mg/L, respectively.

FIGS. 4, 5, 6 and 7 show relevant track run data while operating in a phosphorus removal mode under the loading conditions summarized in Table 3. Parameters are shown for both air-on and air-off sequences and illustrate release-uptake mechanisms for phosphorus, nitrogen and COD. Analysis of these data show rapid substrate uptake relative to the operating floc-load conditions (Table 6), in which the mean residual soluble COD leaving zone (3-10) was 85 mg/l. The biomass settled to 43% of volume in 60 minutes. Effluent quality for this and subsequent cycles is summarized in Table 7.

TABLE 4

EFFLUENT QUALITY DATA FOR FLOC-LOAD OF 66 ± 10 mg COD/gVSS

| Cycle | $BOD_T$ mg/L | $COD_S$ mg/L | $PO_{4S}$ mg/L | $NO_3$-N mg/L | $NH_3$-N mg/L | SS mg/L | Turbidity NTU |
|---|---|---|---|---|---|---|---|
| 1 | 7.4 | 19 | 5.5 | 3.5 | 2.9 | 4 | 2.1 |
| 2 | 4.4 | 19 | 4.9 | 5.4 | 3.3 | 7 | 2.4 |
| 3 | 2.2 | 19 | 1.2 | 6.7 | 0.3 | 1 | 1.9 |
| 4 | 4.2 | — | — | 3.3 | — | 13 | 5.0 |
| 5 | 6.4 | 22 | 6.7 | 3.3 | 2.0 | 7 | 2.6 |
| 6 | 2.0 | 15 | 13.2 | 2.2 | 4.2 | 20 | 5.8 |
| Mean | 4.4 | 19 | 6.3 | 4.1 | 2.5 | 10 | 3.3 |

Similar performance was obtained for operation an aeration feed only and aeration-settle feed protocols. Excursions in effluent $PO_{4S}$, $NH_3$-N and $NO_3$-N concentration were observed at times which were mostly related to an imbalance of soluble substrate availability at the loading conditions described.

Bench-scale studies were subsequently undertaken to examine these transformation in a mixed and unmixed environment. A bench SBR was operated under the same floc-load conditions as the demonstration unit. Aerobic sludge (1200 ml) was transferred to the mixed anaerobic reactor to which 300 ml of acetate spiked raw sewage was added to provide a floc-load reaction condition of around 45 mg COD/gVSS. Denitrification rate was determined at 8.7 mg/L/hr or 3.2 mg/gVSS/hr (20°). FIG. 8 shows phosphate release in the presence of nitrate to a maximum of 11.6 mg/gVSS. The unmixed track run simulates reaction conditions during the settlement and surface skim sequences in a cycle. The release of COD, nitrate uptake and phosphorus release are again demonstrated. It is interesting to note that the soluble BOD associated with the COD release was determined at 3.5 mg/L which suggests the COD transformed is a metabolic by-product which is solution non-biodegradable.

TABLE 5

EFFLUENT QUALITY DATA FOR FLOC-LOAD OF 144 ± 20 mg COD/gVSS

| Cycle | $BOD_T$ mg/L | $COD_3$ mg/L | $PO_{4S}$ mg/L | $NO_3$-N mg/L | $NH_3$-N mg/L | SS mg/L | Turbidity NTU |
|---|---|---|---|---|---|---|---|
| 7 | 3.2 | 22 | 3.7 | 6.5 | 1.2 | 16 | 1.5 |
| 8 | 8.4 | 26 | 7.0 | 2.8 | 6.5 | 6 | 1.8 |
| 9 | 7.0 | 26 | 3.1 | 4.4 | 5.7 | 5 | 1.8 |
| 10 | — | — | — | — | — | — | — |
| 11 | 6.8 | 32 | 3.4 | 3.5 | 5.3 | 7 | 2.3 |
| 12 | 6.2 | 29 | 15.3 | 1.7 | 8.3 | 5 | 3.0 |
| Mean | 6.5 | 27 | 6.5 | 3.8 | 5.4 | 8 | 2.1 |

The un-mixed track run simulates reaction conditions during the settlement and surface skim sequences in a cycle. The release of COD, nitrate uptake and phosphorus release are again demonstrated in FIG. 9. The soluble BOD associated with the COD release was determined at 3.5 mg/L which suggests the COD transformed is a metabolic by-product which in solution is non-biodegradable.

TABLE 6

TYPICAL SUBSTRATE UPTAKE FOR FLOCCULENT BIOMASS

| FLOC-LOAD mg $COD_S$/gVSS | SUBSTRATE UPTAKE mg $COD_S$/gVSS |
|---|---|
| 142 | 64 |
| 147 | 74 |
| 158 | 84 |
| 187 | 117 |
| 240 | 220 |
| 208 | 94 |
| 190 | 103 |
| 220 | 142 |

TABLE 7

EFFLUENT QUALITY ASSOCIATED WITH TRACK RUN

| Cycle | $COD_S$ mg/L | $COD_T$ mg/L | BOD mg/L | $PO_{4S}$ mg/L | $PO_{4T}$ mg/L | $NO_3$-N mg/L | $NH_3$-N mg/L |
|---|---|---|---|---|---|---|---|
| A | 29 | 32 | — | 1.7 | 2.6 | 4.2 | 2.1 |
| B | 22 | 29 | 4.2 | 0.19 | 0.4 | 4.8 | 2.7 |
| C | 35 | 38 | 6.2 | 5.4 | 6.2 | 3.2 | 3.9 |

Additional bench studies were conducted to determine $NH_3$-N and $NO_3$-N removal rates that are appropriate to the feed and operational protocol of this batch reactor. Typical data are summarized in Table 8.

TABLE 8

SUMMARY OF $NH_3$-N AND $NO_3$-N REMOVAL RATES

| $NH_3$-N mg/L/hr | $NH_3$-N mg/gVSS/hr | Temp °C. | $NO_3$-N mg/L/hr | $NO_3$-N mg/gVSS/hr | Temp °C. | Carbon Source |
|---|---|---|---|---|---|---|
| 6.7 | 3.2 | 24 | 3.6 | 2.0 | 24 | Raw Sewage |
| 5.6 | 2.0 | 24 | — | — | — | Zone 2 |
| — | — | — | 2.6 | 0.63 | 20 | Endogenous |
| 4.8 | 2.4 | 23 | 3.2 | 2.1 | 26 | Raw Sewage |
| — | — | — | 6.7 | 4.6 | — | Acetate |
| — | — | — | 8.7 | 3.2 | 20 | Acetate |
| 5.5 | 2.0 | 21 | — | — | — | Raw Sewage |
| 5.6 | 2.1 | 22 | — | — | — | Raw Sewage |

Operation of a batch reactor as configured demonstrated that activated sludge bulking can be prevented while operating on a nitrogen and biological phosphorus removal mode. Optimum performance can be influenced by diurnal variation in influent concentrations of nitrogen, phosphorus and carbon which can be phase displaced.

These studies and other data presented by Shao give weight to the notion of a threshold soluble substrate concentration that favors the growth filamentous microorganisms. This was demonstrated by continued operation at loading conditions which generated soluble substrate leakage through zone (3-10) in excess of 130 mg/L. Uptake of soluble substrate rarely exceeded 50 mg/gVSS through this volume of the reactor under these conditions. Operation with a soluble substrate leakage of 85 mg/L produced a flocculent biomass with acceptable settlement properties. It should be noted that $NO_3$-N concentration in zones (3-10) and 2 rarely exceeded 0.25 mg/L indicating that substrate uptake in these zones is independent of denitrification stoichiometry.

Sludge age during the period of this study varied between 8 and 12 days. Sludge generation amounted to a mean of 0.15 g/g $COD_T$ due to the reduced aerobic hydraulic retention time fraction. Biomass volatile fraction varied between 0.78 and 0.83.

Substrate uptake in zone (3-10) of the system, for a flocculent biomass, exhibited a floc-load relationship. A high level of performance was achieved in a batch reactor in which the hydraulic aerobic retention time was only 4.7 hours per day.

The process of the invention is carried out in three reaction zones which are preferably (but necessarily) portions of a single basin variable volume reactor operated as a sequencing batch reactor through the respective zones. The reaction zones are, in the preferred embodiment, in continuous fluid communication with each other obviating the necessity for multiple liquid-head bearing walls but are separated from one another by baffles to provide separate and distinct reaction zones. The process, per se, could be carried out in three separate reactors; however, to do so would greatly increase the capital and operating costs without gain in efficiency.

The initial reaction zone is an anaerobic reactor. This initial zone can be designed for constant volume operation but considerable savings in cost are effected by carrying out the anaerobic process in this zone as a variable volume reactor, along with the variable volume operation of the subsequent zones. The initial reaction zone is preferably divided into sub-reaction zones by a series of underflow and overflow baffles to accomplish, in effect, plug-flow without substantial mixing of the input sewage in the initial reaction zone.

The secondary reaction zone is a non-aerated mixed reaction zone which, like the initial reaction zone, can be operated as a constant volume zone but is preferable operated as a part of an overall variable volume reactor. The secondary reaction zone is also an anaerobic reaction zone but it is separate from and differs from the initial reaction zone in that the secondary reaction zone is mixed and is generally homogeneous.

The final zone constitutes the main aeration zone and is a sequentially aerated and non-aerated reaction zone in which the co-current nitrogen-denitrification reactions are carried out.

The overall process is, in the preferred embodiment, carried out as a cyclic variable volume process. The cycle period may be varied considerably, but when the process is carried out as a variable volume process the cycle period will normally be from as low as two or three hours and as high as about twelve hours, or even greater but usually at greatly reduced cost effectiveness, and optimally from about four to eight hours per cycle.

During the cycle the final zone is aerated for from about 40% to about 70% typically about 50% to 60% of the cycle. Settling occupies from about 10% to about 50% of the cycle, typically about 30% of the cycle. In-flow, i.e. filling, and skimming, i.e. out-flow, may each occupy from about 1% to about 20% of the cycle, in-flow time preferably occupying no more than about 5% and out-flow and in most cases occupying no more than about 10% of the cycle.

The HRT in the initial and the secondary zones need not be but optimally are about the same and typically range from 5% to 40%, typically about 5-10%, of the HRT of the final reaction zone.

As is described in U.S. Pat. No. 4,663,044, active sludge is recycled from the final zone and mixed with the influent sewage before or near the time it enters the initial zone. Reference is made to the aforementioned patent for the general level of concentrations and compositions in the process, which are substantially the same in the present process. In addition to the process steps described in U.S. Pat. No. 4,663,044, the present process comprises initial and secondary reaction anaerobic zones with recycle of partially treated, fermented but non-aerated sewage, being recycled from the secondary zone to the initial reaction zone. The present process requires that non-aerated conditions prevail in the initial zones as this determines specific reaction conditions which are necessary. If an aerobic environment prevails in the initial zones the desired biological phosphorous removal can be achieved but sludge bulking is a problem. The present process achieves all of the desired results, i.e. removal of biological phosphorous, nitrification and denitrification, and non-bulking sludge. The biotransformations which take place with the non-aerated initial zones permit energy reduction vis-a-vis aeration requirements in the overall treatment process. The influent sewage contains particulate organics, colloidal organics and soluble organics. The particulate organics react slowly in aerobic and/or aerobic reactions. The colloidal organics are converted to soluble constituents in the fermentation reaction. The soluble organics are subject to rapid sequestering and are removed by the initial and secondary zones from the process oxygen reaction requirement by about 0.3 gm $O_2$/gm of soluble COD.

The process mechanism in the anaerobic initial reaction involves the transfer of soluble carbon-containing substrate enzymatically into the biomass. In the subsequent aerobic reaction zone(s) the biomass takes up phosphorous. The immediate energy savings is a function of the fraction of the influent substrate sequestered in the initial anaerobic uptake reactions. This reaction mechanism provides enhanced storage of soluble carbon-containing substrate, selection of the biomass in favor of phosphorous storing bacteria, and competitive selection of non-filamentous bacteria and hence enhanced control and reduction of sludge bulking in the phosphorous and nitrogen biological facility. The process provides for enhanced nitrification due to the selection of organisms that exhibit a higher rate of nitrification and denitrification. The selection of non-filamentous organisms shows rates that are several orders higher than filamentous forms. The process provides for removal of soluble carbon substrate to concentrations which prevent competitive over growth of filamentous bacteria.

The initial zone is defined in terms of floc-load and the secondary zone is defined in terms of net retention time for adequate fermentation of the colloidal substrate fractions, the large molecular weight compounds, to simpler volatile fatty acids, etc. Acetate formation is a function of time and the anaerobic condition of the reactor. A one hour net retention time in the secondary reactor, at the bottom water level condition, is a generally optimum condition, but the times may vary considerably, e.g. from as low as 20 to 30 minutes to as high as one and one-half to two hours, or more, though there is no advantage much longer times; the longer times being required when the influent sewage has a low and inadequate fraction of soluble carbon substrate. Typical generation of substrate is 20–60 mg COD/Lhr for a MLVSS concentration of up to 3000 mg/L. The secondary zone is mixed with minimum intensity to prevent surface oxygen transfer, preferably with a submerged slow-speed propeller mixer or a submerged pump. The design of the baffles or barriers between the secondary zone and the main aerated zone (or the aerated zone next following the secondary zone) should be such as will minimize backflow of oxygen-laden sewage.

The activated sludge recycled from the main aeration zone is mixed with the influent and the mixture is retained in an anaerobic condition for a sufficient period of time, typically from 0.3 to 3 hours, optimally usually in the range of 0.6 to 1.5 hours, to remove by enzymatic transfer soluble carbon substrate compounds from the liquid phase into the biomass sufficiently to permit uptake of phosphorous by the biomass in the aerated zone and favor the growth of non-filamentous sludge producing organisms over the growth of filamentous sludge producing organisms; the reaction being characterized in that the concentration of the residual soluble (i.e. will pass through a 0.45 micron filter) carbon substrate compounds measured as COD is no more than about 30 mg/L, and in the production of non-bulking sludge. The resulting sludge is allowed to settle and the supernatant is decanted. During the settling and decanting periods, within the settled sludge matrix, phosphorous is released and storage carbon by-products are released as COD, with the occurrence of denitrification within and near the sludge matrix. The process is operated cyclically to provide optimum periods of anaerobic reaction, aerobic reaction during the aeration cycle, settling, decanting, and inflow.

The process is operated for cocurrent nitrification and denitrification during the aeration portion of the cycle, to maximize nitrogen removal through a proper balance of activated sludge and dissolved oxygen concentration profile during aeration in the final zone of the system. All zones are preferably in fluid communication and experience the variable volume reaction conditions. Combined operation of the activated sludge process permits treatment energy reduction by maximizing the soluble carbon substrate removal reactions. The process is generally operated to permit 50% hydraulic retention under aerobic reaction conditions and to permit two sequences of phosphorous release and uptake per cycle via the inlet anaerobic configuration and the air-off settling and decantation periods, with cocurrent biological phosphorous and nitrogen removal and a biomass which exhibits good settling properties.

INDUSTRIAL APPLICATION

This invention is useful in treating domestic and industrial sewage.

I claim:

1. A sewage treatment process comprising:
introducing untreated sewage in a non-aerated first single reaction zone that is so configured and operated as to be a non-aerated, variable volume, unmixed plug flow single reaction zone;
reacting the outflow of the first single reaction zone in a second single reaction zone that is so configured and operated as to be a single anaerobic, variable volume, mixed single reaction zone the contents of which are homogeneous during the reaction therein;
reacting the outflow of the second single reaction zone in a third single reaction zone,
the three single reaction zones being so constructed and configured as to be formed in a single basin by baffles separating, respectively, the first single reaction zone from the second single reaction zone and the second single reaction zone from the third single reaction zone, the three zones being in fluid communication with each other and being at the same hydrostatic level as one another;
aerating and mixing the third single reaction zone during a first time period;
permitting the third single reaction zone to be quiescent and non-aerated during a second time period;
recycling anaerobically fermented, partially treated sewage from the second single reaction zone to the first single reaction zone by mixing the partially treated sewage with the untreated sewage inflowing into the first single reaction zone;
recycling activated sludge from the third single reaction zone to the first single reeacton zone by mixing the sludge with the untreated sewage inflowing into the first single reaction zone;
maintaining the contents of the first single reaction zone in plug flow configuration following the initial mixing of the untreated sewage with the partially treated sewage recycled from the second single reaction zone and the sludge from the third single reaction zone;
mixing the contents of the second single reaction zone for keeping said contents homogeneous during the reaction in the second single reaction zone;
during said second time period decanting treated sewage from the third single reaction zone to thereby reduce the volume of and the liquid level in all three single reaction zones; and
following the decanting step, inflowing untreated sewage into the first single reaction zone for operating the three single reaction zones as a variable volume batch reaction system.

2. A sewage treatment process comprising:
periodically introducing untreated sewage in a non-aerated first reaction zone that is so configured and operated as to be a non-aerated, variable volume, unmixed plug flow reaction zone;
reacting the outflow of the first reaction zone in a second reaction zone that is so configured and operated as to be an anaerobic, variable volume, mixed reaction zone the contents of which are homogeneous during the reaction therein;
reacting the outflow of the second reaction zone in a third reaction zone,
the three reaction zones being so constructed and configured as to be formed in a single basin by baffles separating, respectively, the first reaction zone from the second reaction zone and the second reaction zone from the third reaction zone, the three zones being in fluid communication with each other and being at the same hydrostatic level as one another;

aerating and mixing the third reaction zone during a first time period;

permitting the third reaction zone to be quiescent and non-aerated during a second time period;

recycling anaerobically fermented, partially treated sewage from the second reaction zone to the first reaction zone by mixing the partially treated sewage with the untreated sewage inflowing into the first reaction zone;

recycling activated sludge from the third reaction zone to the first reaction zone by mixing the sludge with the untreated sewage inflowing into the first reaction zone;

mixing the contents of the second reaction zone for keeping said contents homogeneous during the reaction in the second reaction zone;

during said second time period decanting treated sewage from the third reaction zone to thereby reduce the volume of and the liquid level in all three reaction zones; and following the decanting step, inflowing untreated sewage into the first reaction zone for operating the three reaction zones as a variable volume batch reaction system.

* * * * *